Nov. 11, 1952 — C. G. DAHM ET AL — 2,617,305
BAROMETER PREHEATER
Filed Dec. 16, 1947 — 2 SHEETS—SHEET 1

INVENTORS
CORNELIUS G. DAHM
DAYTON H. CLEWELL
BY Sidney A. Johnson
ATTORNEY

Nov. 11, 1952         C. G. DAHM ET AL         2,617,305
                      BAROMETER PREHEATER
Filed Dec. 16, 1947                    2 SHEETS—SHEET 2
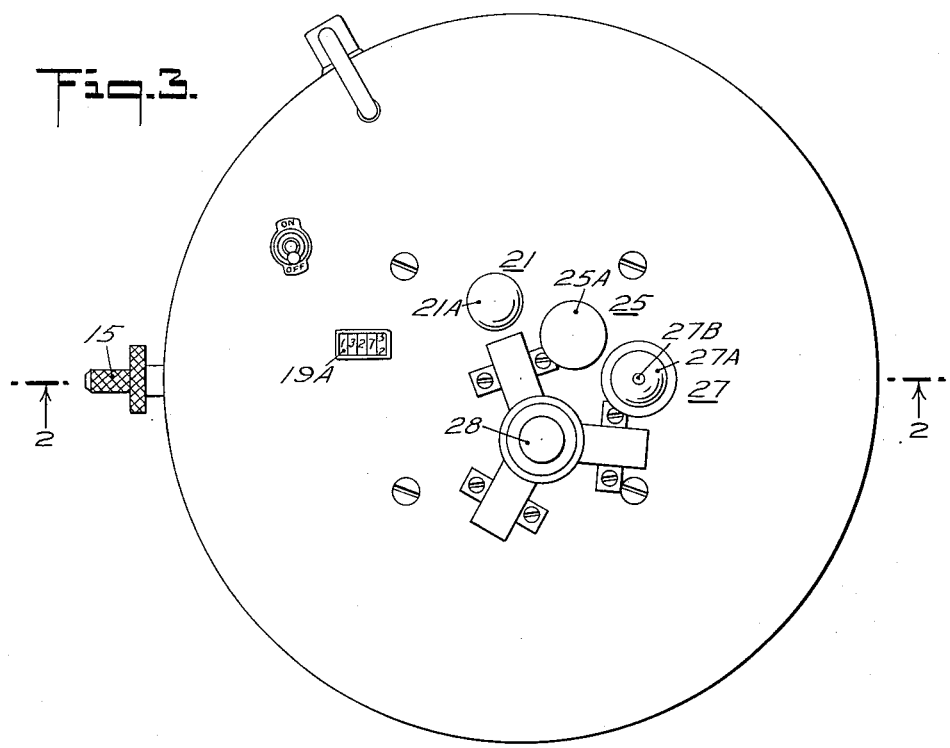
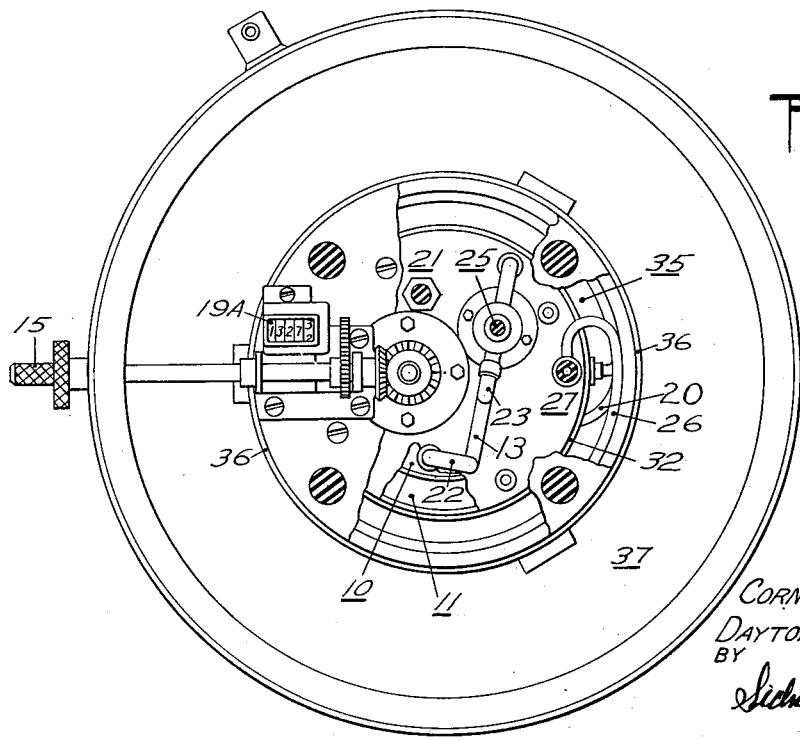
INVENTORS
CORNELIUS G. DAHM
DAYTON H. CLEWELL
BY
Sidney A. Johnson
ATTORNEY Patented Nov. 11, 1952

2,617,305

UNITED STATES PATENT OFFICE 2,617,305

BAROMETER PREHEATER

Cornelius G. Dahm and Dayton H. Clewell, Dallas, Tex., assignors, by mesne assignments, to Socony-Vacuum Oil Company, Incorporated, New York, N. Y., a corporation of New York Application December 16, 1947, Serial No. 791,973

7 Claims. (Cl. 73—384)

1

This invention relates to barometric measuring instruments and more particularly to a barometer disposed within a constant-temperature enclosure and has for an object the provision of paths for flow of air to and from the atmosphere and barometer by means of which paths the air flowing therethroough is heated to the temperature of the barometer.

This invention is particularly applicable to barometric measuring systems or instruments of the type disclosed in copending application, Serial No. 655,660, filed by George E. Conover, a coworker of ours. In such a system flow-connections are provided between the barometer and the atmosphere in order for the barometer to indicate changes in barometric pressure. Upon the occurrence of such changes there is a flow of air to or from the barometer. The barometer itself is disposed within a chamber, the temperature of which is maintained well above the ambient temperature, or the temperature of the air. Accordingly, air flowing to the barometer is of lower temperature than that maintained in the constant-temperature enclosure and produces temperature variations within the barometer. For accurate readings it was found necessary to wait long periods of time, in some instances as long as forty (40) hours, for constant temperature conditions to be restored. The flow of air to barometers of the foregoing type is caused by the use of bellows which changes the volume and pressure within a chamber. Ingress of cooler air to the bellows produces dimensional changes therein which adversely affect the reading of the barometer.

It is an object of this invention to avoid delays in obtaining accurate readings of barometric pressure by eliminating the effects of temperature variations of the atmoshere on the barometer. More specifically, there are provided means for assuring that all air entering the barometer will be at a constant temperature. This, in one form of the invention, is accomplished by providing between the barometer and atmosphere heat transfer paths, which paths are maintained at a constant temperature and thus heat the air as it passes therethrough to the temperature of the barometer. By this means, the barometer as a whole is temperature-stabilized.

For further objects and advantages of the invention, reference should be had to the following description, taken in conjunction with the accompanying drawings, in which:

Fig. 1 diagrammatically illustrates the invention and the principal parts of a barometer to which the invention is particularly applicable;

Fig. 3 is a plan view of the instrument of Fig. 2; and

Fig. 4 is a sectional view taken along line 4—4 of Fig. 2 with certain parts omitted.

Though the invention may be applied to other types of pressure measuring instruments adversely affected by temperature variations and wherein operating parts are preferably to be maintained at constant temperature within a constant-temperature enclosure, it has been illustrated as applied to a barometer of such sensitivity as to be highly useful in measuring differences in elevations.

Figure 1:
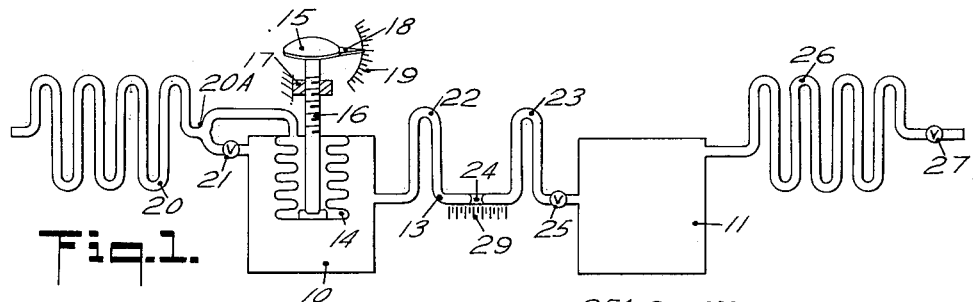
Figure 2:
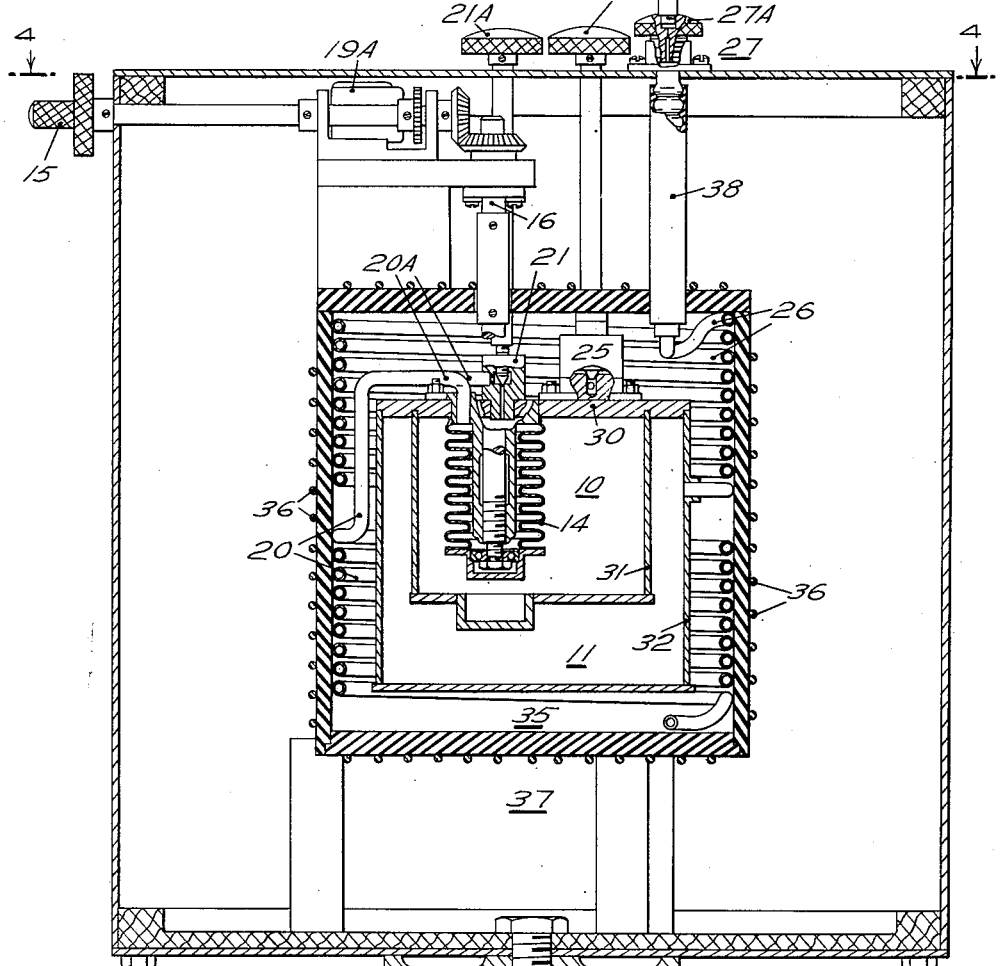
Fig. 2 is a cross-sectional view of a barometric instrument embodying the invention, taken along line 2—2 of Fig. 3.

In order more fully to understand the utility of the invention, the operation of the barometer itself will first be explained. Referring now to Figs. 1 and 2 the barometer comprises a normally sealed chamber 10 and a normally unsealed chamber 11 connected by a capillary tube 13. The volume of chamber 10 may be varied by means of flexible bellows 14. The bellows 14 is expanded or contracted by knob 15 which drives shaft 16 threaded in a support 17. The chamber 10 may be opened to the atmosphere through an elongated tube 20 under the control of valve 21. The capillary tube 13 includes the two inverted U-sections, 22 and 23 respectively, forming traps for a small quantity of liquid, which will be referred to as bubble 24 which is placed in a horizontal section of the tubing located between the traps 22 and 23. The valve 25 is disposed between the liquid trap 23 and the normally unsealed chamber 11. The normally unsealed chamber 11 is connected to the atmosphere by an elongated tube 26 under the control of valve 27.

At a first or a base station generally of a known elevation, valve 25 is closed by rotation of knob 25-A, and the null position of bubble 24 is accurately determined with the aid of viewing eyepiece 28, Fig. 3. Valves 21 and 27 are opened by rotating knobs 21-A and 27-A, the knob 15 is then rotated to a predetermined position thereafter taken as its reference position, and the position of the bubble 24 with respect to the scale 29 is thereafter taken as its null position. The valve 21 is then closed and remains closed until a new base station has been reached or is to be established.

The valve 27 is now closed preparatory to transport the barometer to a second location or station. With the instrument at said second station or location the valve 25 is opened, and the valve 27 is momentarily opened by depressing knob 27-B which controls a very small orifice of valve 27. If a difference of atmospheric pressure exists between the two stations, the resultant pressure differential between chamber 10 and chamber 11 will cause bubble 24 to move and to seek an equilibrium position. The volume of, and pressure within chamber 10 is then changed by turning knob 15 in the direction which returns bubble 24 to its original or null position. By successive steps of momentarily opening the small orifice of valve 27 and adjusting knob 15, the pressure in chamber 10 will be made to equal the atmospheric pressure and the knob 27-A may be rotated to open a relatively large orifice of valve 27 which may be left open with bubble 24 remaining in the null position. The position of pointer 18 with respect to its cooperating scale 19 is then noted and the difference between the readings of pointer 18 on scale 19 (or in Figs. 2, 3 and 4 the readings of counter 19-A for the two locations or stations) is a measure of the difference in atmospheric pressure between the two points and thus the difference in elevation between them may be determined. The difference in elevation between the base station and any further stations may be similarly determined as will be the practice in making elevation surveys. Obviously, difference in elevations between any selected stations may be readily determined.

For further description of these and other features of such a barometric measuring instrument as above briefly described, reference should be had to the above identified copending application Serial No. 655,660.

It will be remembered that upon a change in atmospheric pressure, air will, upon opening of valve 27, flow to or from chamber 11. If air flows into chamber 11, a change in temperature will occur because chamber 11 is maintained above the the ambient temperature. To avoid the effect of temperature changes and to eliminate errors arising therefrom, the foregoing Conover application disclosed the disposition of chamber 10 within an outer chamber 11. The unit thus constructed, Fig. 2, is disposed within a normally unsealed constant-temperature chamber 35. Even though the chamber 35 was maintained at constant temperature above the ambient, for example, at 150° F., as by thermostatically controlled heater elements 36, the ingress of cooler air to chamber 11 gave rise to errors unless readings were taken only after constant-temperature conditions prevailed, a matter which required long waiting periods.

In avoidance of the foregoing problem and in accordance with the present invention, the air flowing to chamber 11 is preheated to the established temperature. A preheater in the form of elongated tubing 26 is disposed within the chamber 35 and air flows from valve 27 by way of preheater coil 26 to the chamber 11. Due to the heat transfer which takes place the air is heated to the constant temperature, as 150° F., and its entry into chamber 11 causes no temperature changes therein.

A further difficulty in operation of the barometer of the aforesaid Conover application arose during the establishment of a new base station and in the taking of readings or measurement of elevation at other known base stations. For example, in operation of the instrument to establish a new base station or to take a new base reading, the bubble 24 is moved to its null position by knob 15, the valve 25 is closed and the valves 21 and 27 are opened, which allows air to flow into or out of chamber 11 through the tube 26 as explained above, and to or from the chamber 10 and chamber 35.

The temperature in chamber 35 is maintained essentially constant but since it is not a sealed chamber, rather one open to the atmosphere, the temperature of the air in that chamber may and usually does differ somewhat from the established temperature in chambers 10 and 11. The present invention provides that air flowing from chamber 35 into chamber 10 will be heated to the established temperature of the chamber 10 and will cause no change of temperature therein. Thus, a preheater in the form of tube 20, similar to tube 26, is disposed within chamber 35 and connected to chamber 10 through the Y-connection 20-A and valve 21. Heat transfer between tube 20 and air flowing from chamber 35 to chamber 10 will cause any air entering chamber 10 to be at the established temperature.

The invention further provides that air entering the bellows 14 when the volume of the bellows is increased will also be at the established temperature. To assure that the air entering bellows 14 is thus conditioned, the Y-connection 20-A is utilized to afford entry of air from the tube 20 into the bellows 14.

The invention thus provides paths through which air entering either chamber 10 or 11 or the bellows 14 is conditions to eliminate instability of the instrument inherent when the ingressive air is cooler than the chambers 10 or 11 or the bellows 14 that it enters.

The invention thus applied completely temperature-stabilizes the barometer making possible continuous surveying operations, the accuracy of which is unaffected by pressure differences which result in ingress or egress of air to or from the barometer.

Each of the preheater coils in the above illustration was formed from one-eighth inch ($\frac{1}{8}''$) copper tubing having a one-sixteenth inch ($\frac{1}{16}''$) inside diameter, and a length of two feet (2'). They are preferably metallic, but may be nonmetallic, as of glass, and may have dimensions dictated by the particular application. The volume of each of the preheaters in applications of this invention depends upon the operating range and conditions under which the instrument is operated. That volume is preferably equal to or greater than the volumetric change of air due to operation of the instrument from one extreme of its range to the other. More particularly, the volume of each of preheaters 20 and 26 may be equal to the change in the volume of the bellows 14 when knob 15 is rotated from one limit to the other. Thus air moved from the preheaters 20 and 26 will always be at the same temperature. In some applications, however, the preheaters may be of smaller volume as dictated by the relationship between efficiency of heat transfer and the range of variations of pressure to be measured. So long as a time-temperature relation is maintained with reference to the rate of heat transfer as to insure constancy of the temperature of the air or fluid flowing into the instrument, the requirements of the present invention are met. In other words, the length of the heat-transfer path has that relation to the rate or volume of fluid flow which produces constant-temperature fluid in the instrument. Where the chambers 10 and 11 are large, obviously a greater time-temperature factor will be required. In the specific application of the invention already referred to this requirement has been met by providing the one-eighth inch (⅛") tubing, two feet (2') long, the volume of which is greater than the volume of air moved therethrough upon operation of the instrument from one limit to the other.

Although a preferred embodiment and a particular application of the present invention has been described, it is to be understood that further modifications may be made within the scope of the appended claims.

What is claimed is:

1. In a barometric measuring system, means for avoiding the alteration of the reading of the barometer due to flow of air thereto of a different temperature than that of the barometer comprising a constant-temperature chamber having said barometric measuring means disposed therein, heating means for the air in said chamber, a structure disposed in heat-transfer relation with the heated air of said chamber and which provides a sinuous path for flow of atmospheric air to said barometric measuring means at the same temperature as said chamber, and valve means for opening said structure to atmosphere for displacement of air from said structure to and from said barometer.

2. A barometric measuring system of the type in which a barometer having two chambers connected by a null indicating means is disposed within, and maintained at the temperature of, a constant-temperature chamber, characterized by the provision of heating means for said chamber and means for avoiding alteration of the reading of the barometer which would arise by flow of atmospheric air thereto at a different temperature than that of the barometer comprising conduit means forming elongated paths for the flow of air from the atmosphere to the barometer, said conduit means being disposed to be heated to the same temperature as said chamber for delivery of air at the same temperature as said barometer, and valve means opening said conduit to the atmosphere for displacement of air from said conduit means to and from said barometer.

3. Means for stabilizing a pressure measuring instrument disposed in a constant-temperature chamber comprising a preheater having a flow-path disposed in heat-transfer relation with said constant-temperature chamber and fluid-connected to the pressure measuring instrument, heating means for said chamber, said flow-path having a length in relation to rate of fluid-flow which brings to the temperature of said chamber all fluid passing therethrough to said instrument, and valve means opening said flow-path to atmosphere for displacement of air therein to and from said pressure-measuring instrument.

4. In a pressure measuring instrument wherein two chambers are disposed within a constant-temperature enclosure and interconnected by indicating means responsive to pressure differences between the two chambers, and displaceable means within one of said chambers for varying the volume thereof, the combination of preheaters associated with each of said chambers, each comprising a coil of tubing disposed within said constant-temperature enclosure, and each of said coils having one end open to the atmosphere and the other end to its respective chamber.

5. In a pressure measuring instrument wherein two chambers are disposed within a constant-temperature enclosure and interconnected by indicating means responsive to pressure differences between the two chambers, and displaceable means within one of said chambers for varying the volume thereof, the combination of means including a heater for holding constant the temperature of said enclosure, preheaters associated with each of said chambers and each comprising a coil of tubing disposed within, and maintained at the same temperature as that of, said constant-temperature enclosure, and each of said coils having one end open to the atmosphere and the other end to its respective chamber, the volume of each of said preheaters being at least equal to the maximum change of volume of one of said chambers by the operation of said displaceable means therein for transfer of air to and from each of said chambers without change of the temperature of the air within said chambers.

6. In a pressure measuring instrument wherein a constant-volume chamber and a variable-volume chamber are disposed in a constant-temperature enclosure and interconnected by indicating means responsive to pressure differences between the two chambers, the combination of means including a heater for holding constant the temperature of said enclosure, a preheater which comprises tubing disposed within, and maintained at the same temperature as that of, said constant-temperature enclosure, controlling means associated with said tubing, one end thereof being connected to said constant-volume chamber, and the other end thereof being open to atmosphere for flow of air in either direction therethrough for transfer of air to and from each of said chambers without change of the temperature of the air within said chambers.

7. In a pressure measuring instrument wherein two chambers are disposed within a constant-temperature enclosure and interconnected by indicating means responsive to pressure differences between the two chambers and displaceable means within one of said chambers for varying the volume thereof, the combination of means including a heater for holding constant the temperature of said enclosure, preheaters associated with each of said chambers and with said volume varying means, each preheater comprising a coil of tubing disposed within and maintained at the same temperature as that of said constant-temperature enclosure and flow-controlling means associated with each of said coils controlling flow of air in either direction therethrough for transfer of air to and from each of said chambers without change of the temperature of the air within said chambers.

CORNELIUS G. DAHM.
DAYTON H. CLEWELL.

REFERENCES CITED

The following references are of record in the file of this patent:

UNITED STATES PATENTS

| Number | Name | Date |
|---|---|---|
| 1,805,321 | Ullman | May 12, 1931 |
| 1,908,042 | Moore | May 9, 1933 |
| 2,339,229 | Wyllie | Jan. 11, 1944 |
| 2,434,837 | Cornett | Jan. 20, 1948 |

FOREIGN PATENTS

| Number | Country | Date |
|---|---|---|
| 28,625 | Great Britain | Dec. 19, 1912 |